US010070508B2

(12) United States Patent
Ricks et al.

(10) Patent No.: US 10,070,508 B2
(45) Date of Patent: Sep. 4, 2018

(54) PORTABLE SECURITY FENCING

(71) Applicant: Perimeter Security Systems, LLC, Fort Mill, SC (US)

(72) Inventors: Colin E. Ricks, Charlotte, NC (US); Dean A. Lowder, Isle of Palms, SC (US)

(*) Notice: Subject to any disclaimer, the term of this patent is extended or adjusted under 35 U.S.C. 154(b) by 160 days.

(21) Appl. No.: 14/801,190

(22) Filed: Jul. 16, 2015

(65) Prior Publication Data

US 2017/0019980 A1    Jan. 19, 2017

(51) Int. Cl.
| | | |
|---|---|---|
| *A01K 3/00* | (2006.01) | |
| *H05C 1/00* | (2006.01) | |
| *E04H 17/02* | (2006.01) | |
| *E04H 17/24* | (2006.01) | |
| *E04H 17/04* | (2006.01) | |
| *E04H 17/18* | (2006.01) | |

(52) U.S. Cl.
CPC ............ *H05C 1/00* (2013.01); *A01K 3/005* (2013.01); *E04H 17/02* (2013.01); *E04H 17/04* (2013.01); *E04H 17/18* (2013.01); *E04H 17/24* (2013.01)

(58) Field of Classification Search
CPC .......... A01K 3/005; A01K 3/00; A01K 3/002; E04H 17/02; E04H 17/24; E04H 17/04; H05C 1/00; G08B 13/12; G08B 13/22; G08B 13/26; G08B 13/122; G08B 13/2491; G08B 13/2497
USPC .......... 256/1, 10, 11, 24, 25, 2, 12; 340/564, 340/541
See application file for complete search history.

(56) References Cited

U.S. PATENT DOCUMENTS

| | | | |
|---|---|---|---|
| 2,801,823 A | | 8/1957 | Clements |
| 3,230,518 A | * | 1/1966 | Vassil .................. G08B 13/26 327/517 |
| 3,387,825 A | | 6/1968 | Kreeger |
| 3,756,566 A | | 9/1973 | Bangs |
| 3,763,482 A | * | 10/1973 | Burney ............... G08B 13/122 174/115 |
| 4,145,030 A | | 3/1979 | Ingraham |
| 4,450,434 A | * | 5/1984 | Nielsen ............... G08B 13/124 250/227.15 |

(Continued)

FOREIGN PATENT DOCUMENTS

GB         2119550 A  * 11/1983  .......... G08B 13/122

*Primary Examiner* — Amber Anderson
*Assistant Examiner* — Nahid Amiri
(74) *Attorney, Agent, or Firm* — Blake E. Vande Garde; Erickson Kernell IP, LLC

(57) ABSTRACT

A portable electric fence kit for the erection of a temporary electric fence comprising: a primary fence section which is portable and non-electrified having two or more poles, a secondary fence section having two or more insulated poles secured to the poles of the primary fence section and having the ability to be electrified using a plurality of wires spanning the distance between the insulated poles, a plurality of wires spanning the distance between the insulated poles, system controls operationally associated with the fence sections, a power source operationally associated with the fence sections and the system controls, the power source providing electricity to the secondary fence sections and a coupling means which allows for one section of the fence kit and its wires to be coupled to another section of the fence kit and its wires.

16 Claims, 6 Drawing Sheets

(56) References Cited

U.S. PATENT DOCUMENTS

| | | | | |
|---|---|---|---|---|
| 4,571,578 A | * | 2/1986 | Karas | G08B 13/2497 |
| | | | | 256/12 |
| 4,695,677 A | * | 9/1987 | Ruth | H02G 7/02 |
| | | | | 174/161 F |
| 5,072,915 A | * | 12/1991 | Shirley | A01K 3/005 |
| | | | | 256/10 |
| 5,738,341 A | | 4/1998 | Lease | |
| 6,036,175 A | | 3/2000 | Harper | |
| 6,173,942 B1 | * | 1/2001 | Weinreich | A01K 3/005 |
| | | | | 174/161 F |
| 6,257,558 B1 | * | 7/2001 | Levine | A01K 3/005 |
| | | | | 191/12.2 R |
| 6,264,172 B1 | * | 7/2001 | Ball | A01K 3/005 |
| | | | | 256/10 |
| 6,595,496 B1 | | 7/2003 | Langlie et al. | |
| 6,712,339 B1 | * | 3/2004 | Smith | A01K 3/005 |
| | | | | 256/10 |
| 6,980,108 B1 | * | 12/2005 | Gebbia | G08B 13/124 |
| | | | | 340/541 |
| 7,350,480 B1 | | 4/2008 | Hughes | |
| 7,466,228 B2 | * | 12/2008 | Wong | E01F 13/12 |
| | | | | 340/541 |
| 7,532,118 B2 | * | 5/2009 | Gitelis | G08B 13/122 |
| | | | | 200/61.45 R |
| 8,840,090 B2 | * | 9/2014 | Moore | A01K 3/00 |
| | | | | 256/11 |
| 2007/0041789 A1 | * | 2/2007 | Monroe | B67D 7/3218 |
| | | | | 405/54 |
| 2009/0032790 A1 | | 2/2009 | Timms | |
| 2011/0198878 A1 | | 8/2011 | Maley | |

* cited by examiner

PORTABLE SECURITY FENCING

FIELD OF THE INVENTION

This invention relates to transportable security fencing which may be assembled and disassembled from any desired location whenever necessary.

BACKGROUND OF THE INVENTION

Theft from worksites is a constant problem that all contractors, whether general or sub, have to contend with. Erecting a fence around a worksite is one manner to deter theft and to protect the public from construction site dangers. The use of temporary fencing is preferred because it is constructed in such a way that it allows for easy installation and it can be moved without a great amount of effort. Temporary construction fencing is often required by law and is designed to protect the work site, decrease liability, and improve the aesthetics of the work zone. It also protects nearby vehicles and pedestrians from the dust and debris that an active construction site can create.

There are multiple types of temporary fencing that can be used on construction sites. Site managers must look at the functionality of the fence, but also at its ease of setup, breakdown and storage. The addition of an electrical deterrent adds to the security of a perimeter fence. Electric fences generally employ a bare wire through which electricity may be conducted for purposes of imparting an electrical shock to an individual coming into contact with a wire. When an individual comes into contact with an electrically charged wire, voltage in the wire is conducted through the individual and into the ground causing a painful shock and thus deterring the thief from entering the construction site.

Accordingly, there is a need for a portable, temporary fence which may be electrified to aid in the protection of goods.

SUMMARY OF THE INVENTION

A portable electric fence kit for the erection of a temporary electric fence comprising: a primary fence section which is portable and non-electrified having two or more poles, a secondary fence section having two or more insulated poles secured to the poles of the primary fence section and having the ability to be electrified using a plurality of wires spanning the distance between the insulated poles, a plurality of wires spanning the distance between the insulated poles, system controls operationally associated with the fence sections, a power source operationally associated with the fence sections and the system controls, the power source providing electricity to the secondary fence sections and a coupling means which allows for one section of the fence kit and its wires to be coupled to another section of the fence kit and its wires.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DESCRIPTION OF THE INVENTION

Figure 1:
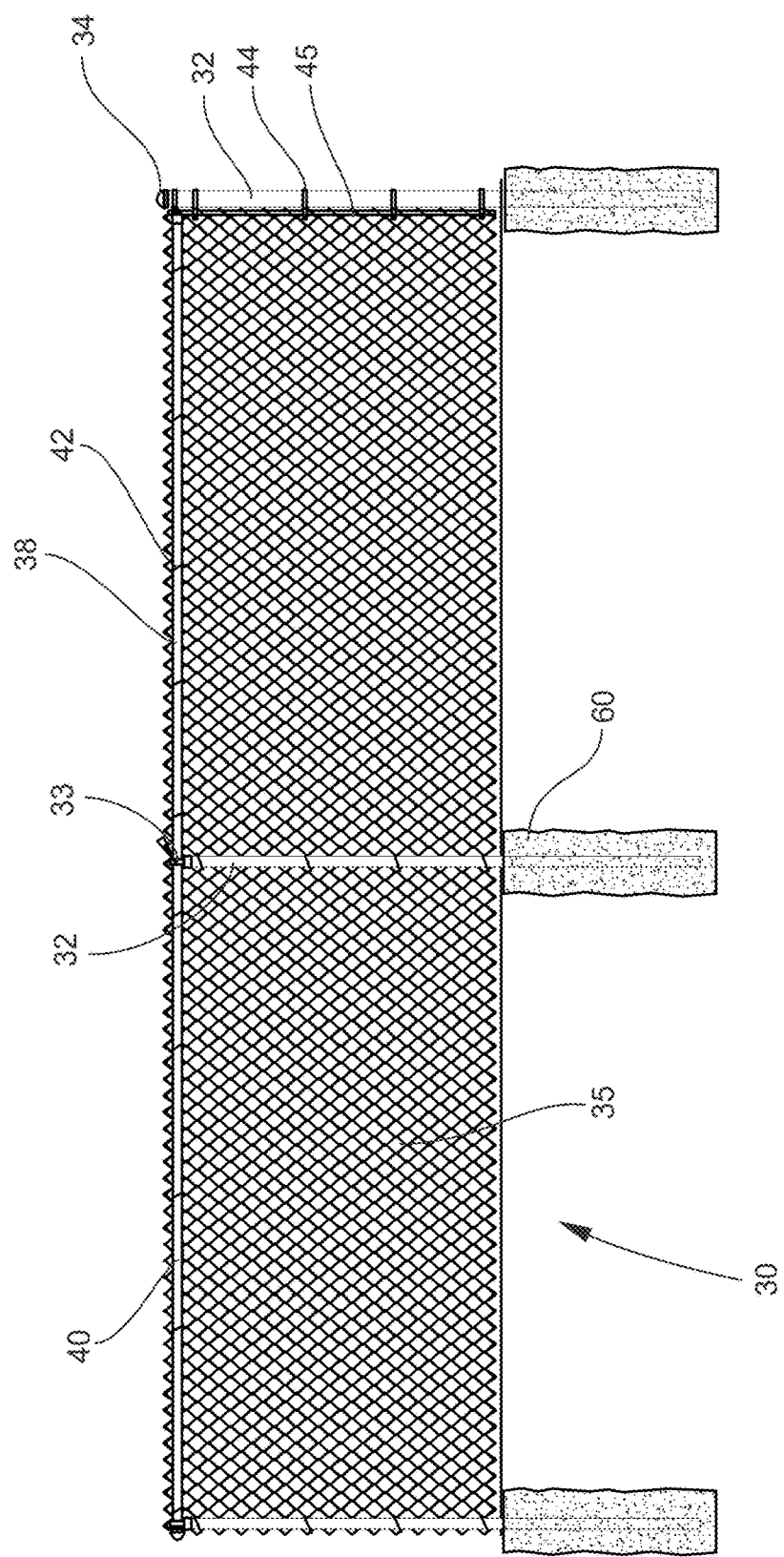
FIG. 1 illustrates a front view of one embodiment of the instant invention.
Figure 2:
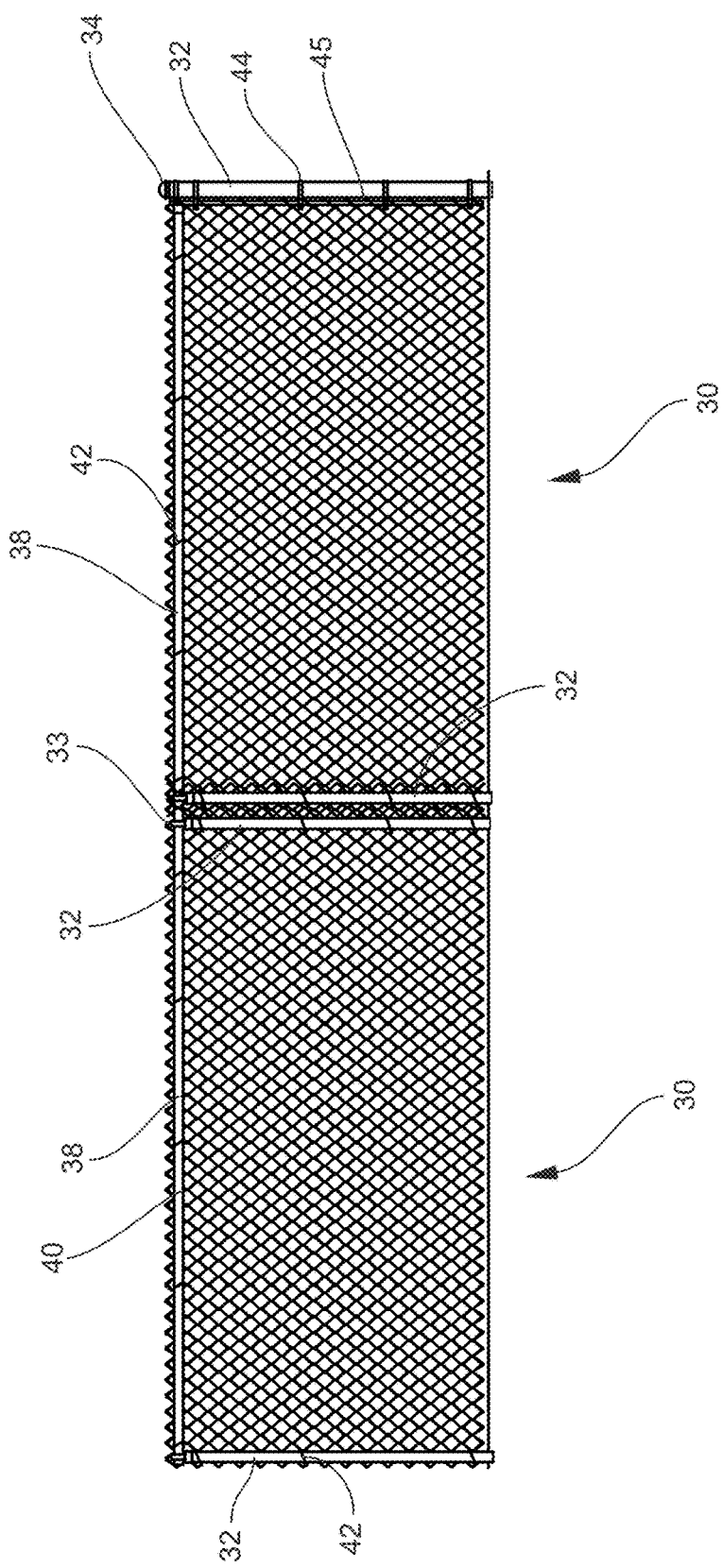
FIG. 2 illustrates a front view of one embodiment of the instant invention.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Looking now to the figures where like number indicate like items, one embodiment of instant invention includes a portable electric fence kit 10 for the erection of a temporary electric fence 20 with the kit comprising a primary fence section 30 which is portable and non-electrified having two or more poles 32, a secondary fence section 50 having two or more insulated poles 52 secured to the poles 32 of the primary fence section 30 by some form of connecting means 62 and having the ability to be electrified using a plurality of wires 55 spanning the distance between the insulated poles 52. The kit further includes a plurality of wires 55 spanning the distance between the insulated poles 52, system controls 70 operationally associated with the fence sections 30, 50, where the system controls 70 have the ability to control the electrification of the secondary fence sections 50, a power source 80 operationally associated with the fence sections 30, 50 and the system controls 70, with the power source 80 providing electricity to the secondary fence sections 50 and a coupling means 62 which allows for one electrified fence section 65 of the fence kit 10 and its wires 55 to be coupled to another electrified fence section 65 of the fence kit 10 and its wires 55.

Portable fence, as used herein, refers to any kind of fence known in the art which may be transported to a location, such as a construction site, assembled at that location to create a perimeter fence of whatever length and shape is required to secure the location, left at the location for whatever duration is necessary/required and then disassembled and removed from the location when the portable fence is no longer necessary/required.

Primary fence section 30, as used herein, refers to any fence section which includes two or more poles 32. A primary fence section 30 is portable and may be attached and/or operationally associated with a plurality of other primary fence sections 30 in order to construct/create a perimeter around a desired location. A primary fence section has an inner side 36 which would generally face the interior of a perimeter fence configuration and an outer side 37 which would generally face the exterior of a perimeter fence configuration. A primary fence section 30 may be either electrified or non-electrified. A primary fence section 30 may include a top rail, a bottom rail, a tension wire, or a combination thereof. In one embodiment of the instant invention, a primary fence section may include a chain-link fence, a mesh fence, barbed wire, or a combination thereof.

Secondary fence section 50, as used herein, refers to any fence section which includes two or more insulated poles 52 which are secured to a primary fence section 30. A secondary fence section 50 is portable and may be attached and/or operationally associated with a plurality of other primary fence sections 30 and secondary fence sections 50. A secondary fence section 50 has an inner side 53 which would generally face the interior of a perimeter fence configuration and an outer side 54 which would generally face the exterior of a perimeter fence configuration. A secondary fence section 50 will generally be secured to a primary fence section 30 where the outer side 36 of the secondary fence section faces the inner side 36 of the primary fence section. A secondary fence section 50 has the ability to be electrified using a plurality of wires 55 which span the distance between the insulated poles 52. A secondary fence section 50 may include a top rail, a bottom rail, a tension wire, or a combination thereof. In one embodiment of the instant invention, the insulated poles 52 of the secondary fence section 50 span the same horizontal distance and vertical distance as the poles 32 of the primary fence section 30. In another embodiment, the insulated poles 52 of the secondary fence section 50 span the same horizontal distance, but extend above the height of the poles 32 of the primary fence section to extend both the height and the protection of the secondary fence section 50. A secondary fence section 50 is secured to a primary fence section 30 by some form of connecting means 62. The connecting means 62 may be any form known in the art including, but not limited to, a metal or plastic bracket, a weld or any combination thereof. In one embodiment of the instant invention, the insulated poles 52 may be comprised of a conductive material and the wires 55 are secured to the poles 52 using an insulator attached to the poll to keep the current from jumping off the wire 55. The connecting means 62 secure the secondary fence sections 50, a distance in the range of 5 to 30 cm from the primary fence sections 32 which they are coupled.

Wires 55, as used herein, refers to any wire which is capable of carrying an electric current. Wires 55 include uninsulated wire 56, insulated wire 57, and grounded wire 58. A plurality of wires 55 span the distance between the insulated poles 52 of a secondary fence section 50. In one embodiment of the instant invention, the wires 55 span the distance horizontally between the insulated poles 52 in a pattern alternating between uninsulated wires 56 and grounded wires 58 with one or more insulated live wires 57 at an end. In still another embodiment, the wires 55 are configured in a serpentine pattern. In yet another embodiment, the plurality of wires 55 may be distributed in any pattern between the insulated poles 52 which will result in an individual coming into contact with one or more of the wires during an attempt to either climb over, crawl under, or cut through a primary fence section 50.

System controls 70, as used herein, refer to controls which are operationally associated with the primary fence sections 30, the secondary fence sections 50, the power source 80, and the monitoring module 100. The system controls 70 have the ability to control the electrification of the secondary fence sections 50. The system controls 70 have the ability to configure and operate the monitoring module 100. In one embodiment of the instant invention, the system controls 70 are portable. In another embodiment, the system controls 70 include an electric fence energizer (not illustrated), a monitoring module 100, a control panel 75 and a wireless communicator 76. In still another embodiment, the insulated wires 57 and non-insulated 56 live wires originate at the system controls 70.

A monitoring module 100, as used herein, refers to a device which allows for the temporary electric fence 20 to be monitored both on-site and/or remotely. A monitoring module may include an on-site monitor 102, (e.g., a desktop computer, a laptop computer), a remote monitor 104, (e.g., a laptop computer, a tablet, a smart phone, etc.), a wireless communicator 105, or a combination thereof.

A power source 80, as used herein, refers to any device which is capable of supplying electric power to the electric fence kit 10. A power source 80 is selected from the group including, but not limited to, battery power 81, grid power 82, solar power 83, wind power 84, or a combination thereof.

In one embodiment of the present invention, the electric fence kit 10 further includes an integrated footer or base 60 operationally associated with each pole 32 of the primary fence section 30.

Figure 6:
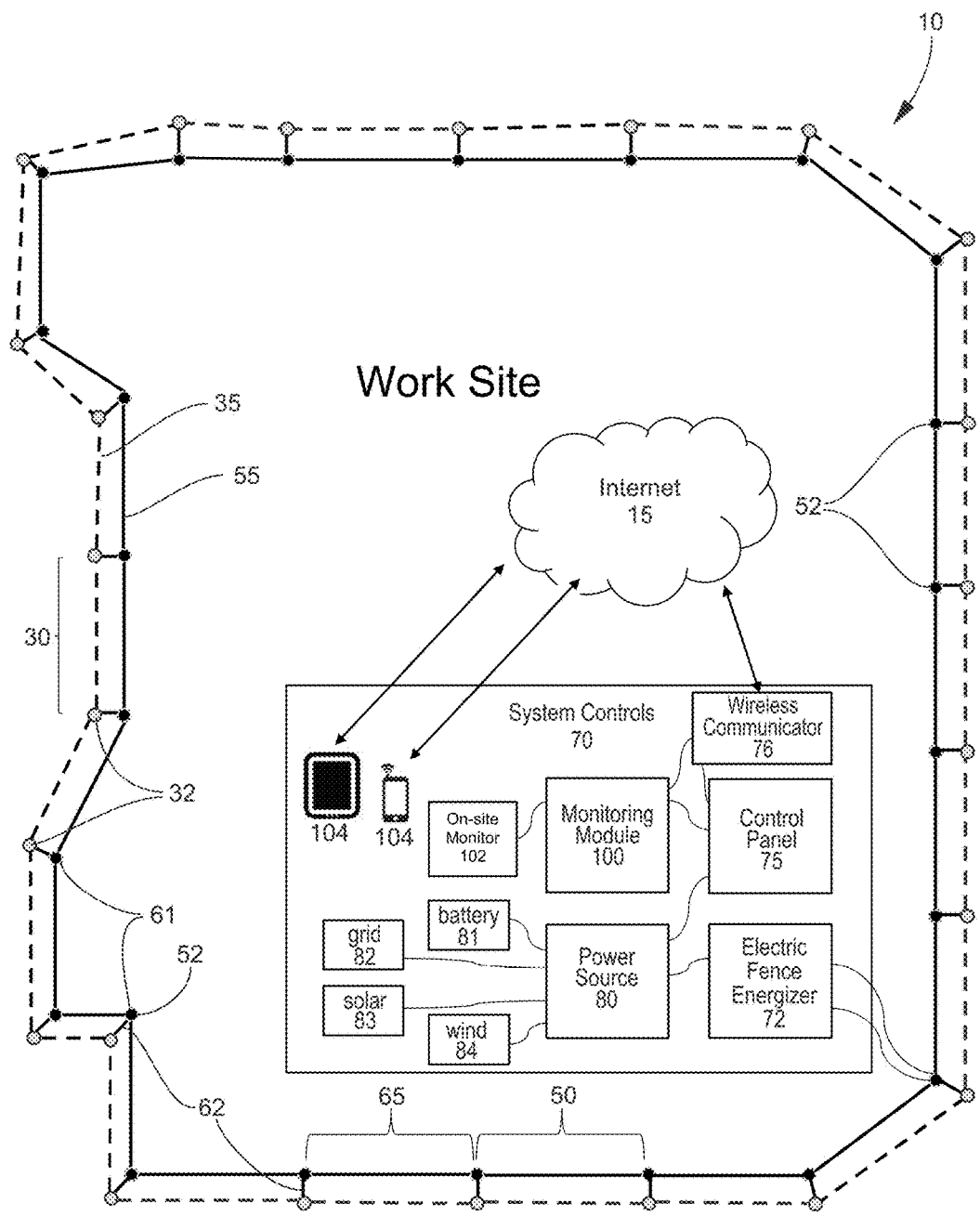
FIG. 6 top down view and diagram of one embodiment of the instant invention.

Another embodiment of the instant invention includes a portable electric fence kit 10 for the erection of a re-usable, temporary electric fence comprising: one or more primary fence section 30 which is portable and non-electrified having two or more poles 32, one or more secondary fence sections 50 having two or more insulated poles 52 secured to the poles 32 of the primary fence section 30 using some type of coupling means 61 and having the ability to be electrified using a plurality of wires 55 spanning the distance between the insulated poles 52 and plurality of wires 55 spanning the distance between the insulated poles. System controls 70 are operationally associated with the fence sections 30, 50 and the system controls 70 have the ability to control the electrification of the secondary fence sections 50. A power source 80 is operationally associated with the fence sections 30, 50 and the system controls 70, the power source 80 provides electricity to the wires 55 of the secondary fence sections 50. A coupling means 61 allows for one electrified fence section 65 of the fence kit 10 and its wires 55 to be coupled to another electrified fence section 25 of the fence kit 10 and its wires 55. A monitoring module 100 allows for the temporary electric fence 20 to be monitored both on-site and/or remotely. An integrated footer or base 60 is operationally associated with each pole 32 of the primary fence section 30 and the primary fence sections 30 and secondary fence sections 60 are coupled together at variable angles resulting in a fence line of variable length and shape (see FIG. 6). Additionally, the primary fence sections 30 and the secondary fence sections 50 may use a stake or any other type of anger in order to add strength and stability to the fence line during or after its construction.

Figure 3:
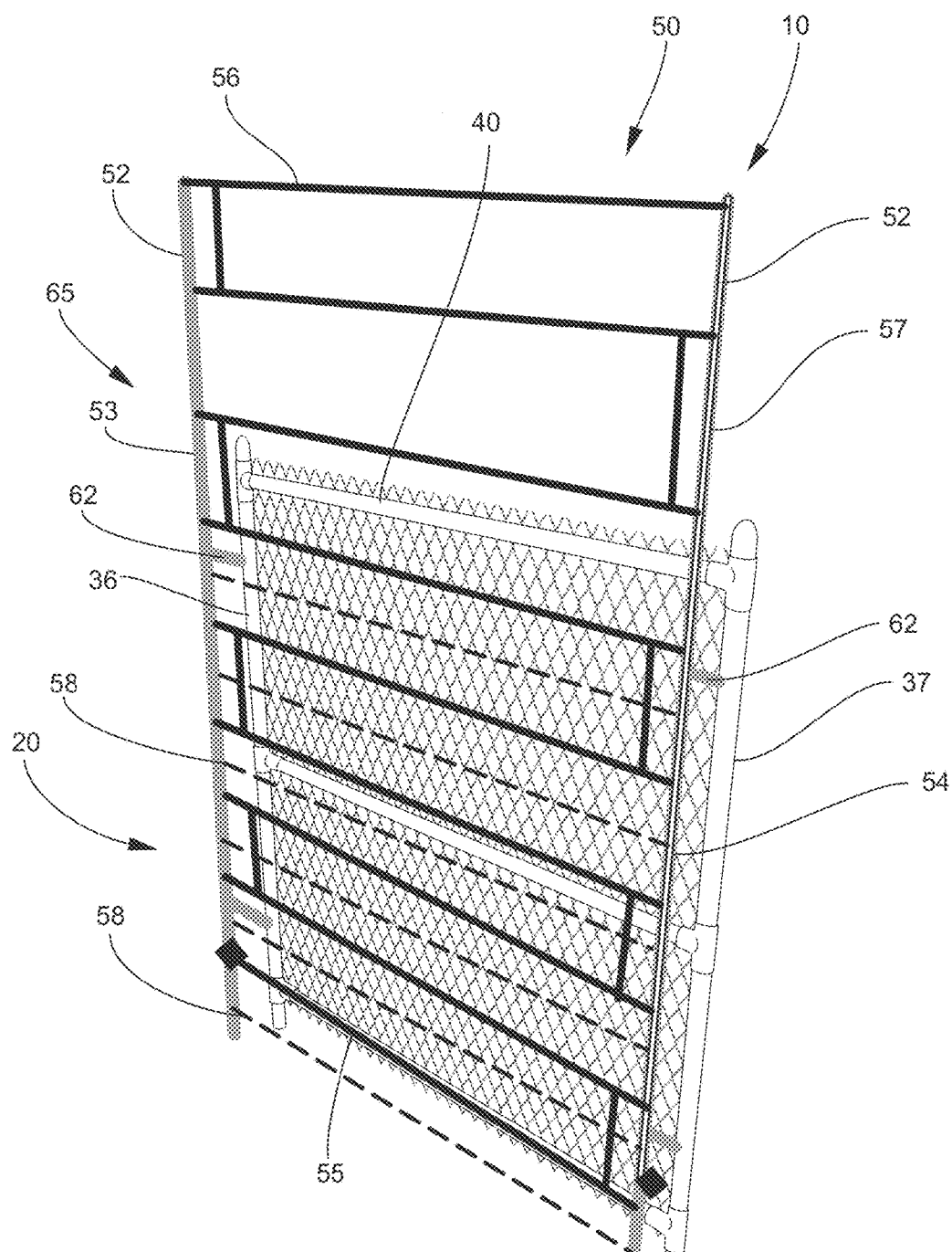
FIG. 3 a perspective view of one embodiment of the instant invention.
Figure 4:
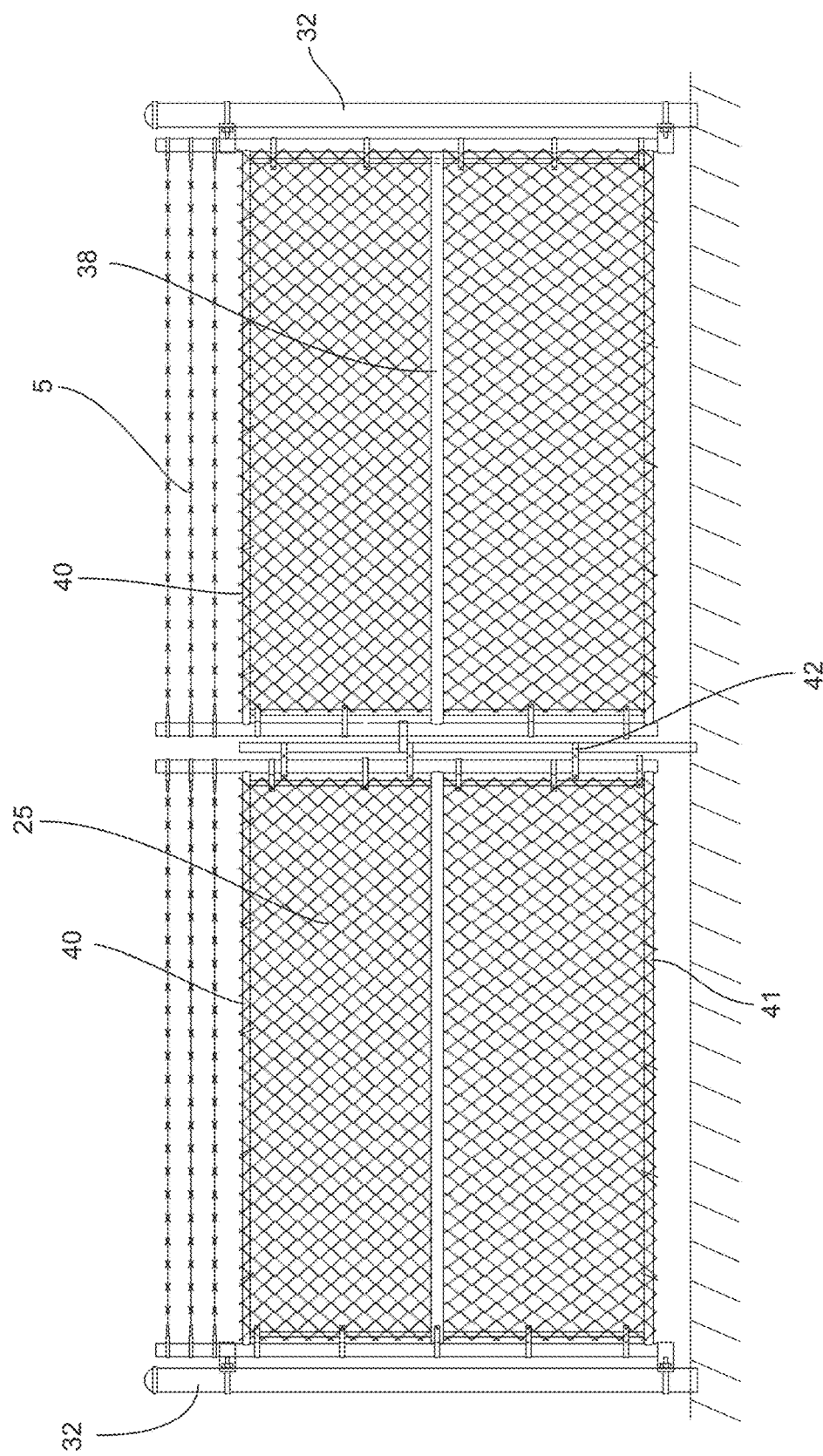
FIG. 4 a front view of one embodiment of the instant invention.
Figure 5:
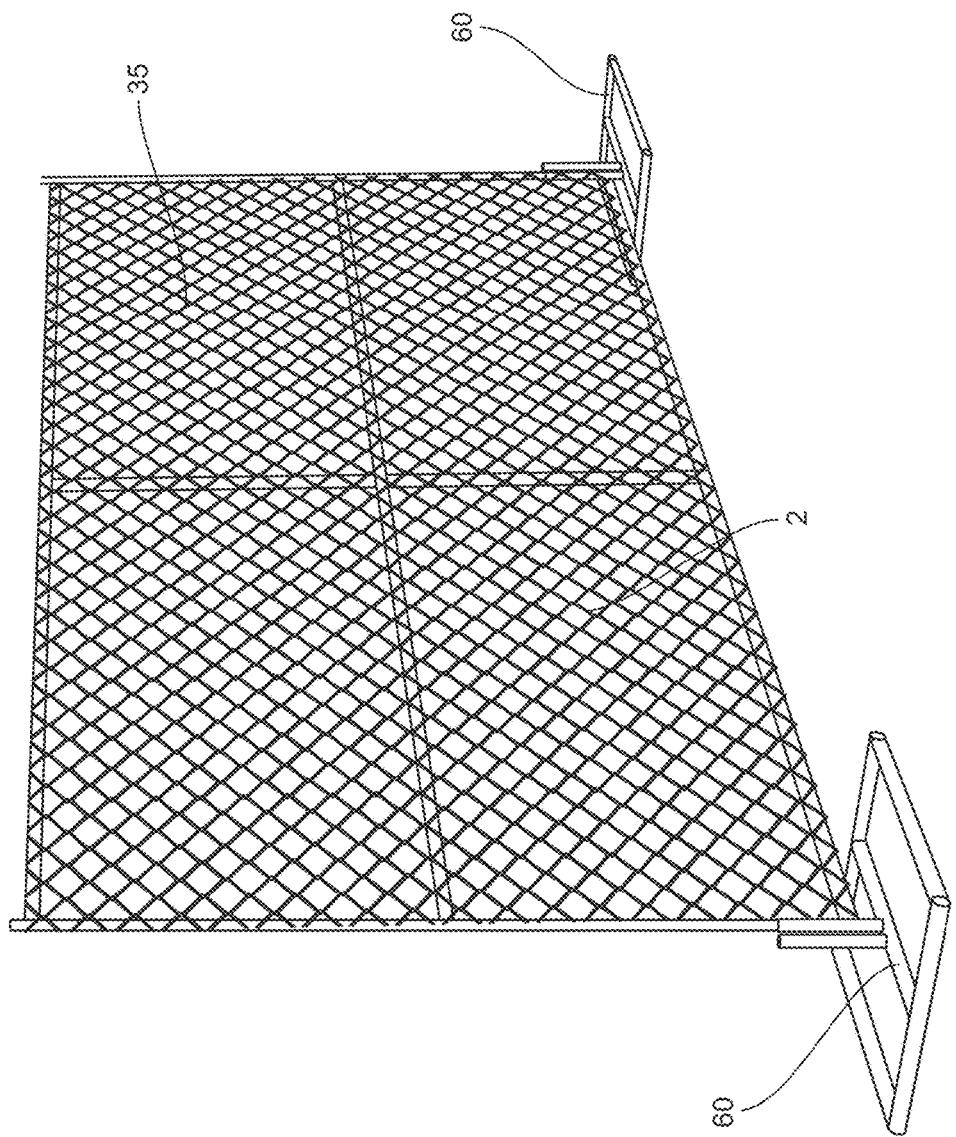
FIG. 5 a perspective view of one embodiment of the instant invention.

Looking to FIG. 3 there is illustrated one embodiment of the instant invention where the wires 55 span the distance horizontally between the insulated poles 52 in a pattern alternating between uninsulated wires 56 and grounded wires 58 with one or more insulated live wires 57 at an end. The wires may be strung between the insulated poles 52 in any pattern which will make contact with one or more wires 55 likely if an individual attempts to crawl under, climb over, or go through a primary fence section 30. Hence, the wires may be strung vertically, horizontally, diagonally, or any combination thereof. In one embodiment, the wires 55 are configured in a serpentine pattern.

The insulated poles 52 of the secondary fence sections 50 span the same horizontal distance and vertical distance as the poles 32 of the primary fence section 30. The insulated poles 52 of the secondary fence sections 50 can also span the same horizontal distance as the poles 32 of the primary fence section 30 and extend vertically between 15 and 60 cm higher vertically than the poles 32 of the primary fence section 30. In one embodiment, the insulated 57 and non-insulated live wires 56 originate at the system controls 70 and the system controls include an electric fence energizer 72, a monitoring module 100, a control panel 75 and a wireless communicator 76. The system controls 70 may either remain on-site or they may be portable.

The instant invention also includes a method of protecting a construction site comprising the steps of: providing a portable electric fence kit 10 for the erection of a re-usable, temporary electric fence 20 comprising: one or more primary fence sections 30 which are portable and non-electrified having two or more poles 32, one or more secondary fence sections 50 having two or more insulated poles 52 secured to the poles 32 of the primary fence section 30 and having the ability to be electrified using a plurality of wires 55 spanning the distance between the insulated poles; a plurality of wires 55 spanning the distance between the insulated poles; system controls 70 which are operationally associated with the fence sections 30, 50, where the system controls have the ability to control the electrification of the secondary fence sections 50; a power source 80 is operationally associated with the fence sections 50 and the system controls 70, the power source 80 provides electricity to the secondary fence sections 50; a coupling means 61 allows for one electrified fence section 65 of the fence kit and its wires 55 to be coupled to another electrified fence section 65 of the fence kit and its wires 55; a monitoring module 100 allows for the electric fence 20 to be monitored both on-site and/or remotely; and an integrated footer or base 60 operationally associated with each pole 32 of the primary fence section 30;

a. erecting a primary fence section 30;
b. securing a secondary fence section 50 to the primary fence section 30 in the previous step using one or more forms of connecting means 62;
c. connecting the plurality of wires 55 to the power source 80, system controls 70 and monitoring module 100 and/or coupling the fence sections from steps (a) and (b) to a previously erected primary 30 and secondary 50 fence section;
d. repeating steps (a) through (c) until the construction site is protected and wherein the primary fence sections 30 and secondary fence sections 50 are coupled together at variable angles resulting in a fence line of variable length and shape;

activating the system controls 70, including the control panel 75 to electrify the plurality of wires 55; and activating the monitoring system 100 to alert one or more persons when the system registers a contact with one or more of the wires 55.

Any method described herein may incorporate any design element contained within this application and any other document/application incorporated by reference herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present invention may be embodied in other forms without departing from the spirit and the essential attributes thereof, and, accordingly, reference should be made to the appended claims, rather than to the foregoing specification, as indicating the scope of the invention. The invention illustratively discloses herein suitably may be practiced in the absence of any element which is not specifically disclosed herein.

We claim:

1. A portable electric fence kit for the erection of a temporary electric fence comprising:
   a primary fence section which is portable and non-electrified having two or more poles, the primary fence section has an inner side and an outer side, a top and a bottom;
   a secondary fence section having two or more insulated poles secured to the poles of the primary fence section and having the ability to be electrified using a plurality of wires comprising insulated and non-insulated live wires which are secured to and span the distance between the insulated poles, the secondary fence section has an inner side and an outer side, a top and a bottom;
   wherein the plurality of wires is secured to each of the insulated poles and spans the distance horizontally between the insulated poles in a pattern alternating between uninsulated wires and grounded wires with one or more insulated live wires at each end of the spanned distance;
   wherein the secondary fence section is laterally secured to the primary fence section and the inner side of the primary fence section faces the outer side of the secondary fence section;
   wherein the bottom of the primary fence and the bottom of the secondary fence are positioned at or near a same height as each other; and
   wherein the top of the secondary fence is positioned at a height at or above the top of the primary fence;

system controls operationally associated with the plurality of wires of said secondary fence sections, said system controls having the ability to control the electrification of said secondary fence section;

a power source operationally associated with said fence sections and said system controls, said power source providing electricity to said secondary fence section; and a coupling means which allows for the plurality of wires associated with one secondary fence section of the fence kit to be coupled to the plurality of wires associated with another secondary fence section of the fence kit.

2. The electronic fence kit of claim 1 wherein the plurality of wires are configured in a serpentine pattern.

3. The electric fence kit of claim 1 wherein the insulated poles of the secondary fence section span the same horizontal distance and vertical distance as the poles of the primary fence section.

4. The electric fence kit of claim 1 wherein said fence kit further includes a monitoring module which allows for said electric fence to be monitored both on-site and/or remotely.

5. The electronic fence kit of claim 1 wherein the insulated and non-insulated live wires are operationally associated with and originate at the system controls.

6. The electronic fence kit of claim 1 wherein the system controls include an electric fence energizer, a monitoring module, a control panel and a wireless communicator.

7. The electronic fence kit of claim 1 wherein the system controls are portable.

8. The electronic fence kit of claim 1 wherein the power source is selected from the group including, but not limited to, battery power, grid power, solar power, wind power, or a combination thereof.

9. The electronic fence kit of claim 1 wherein said fence kit further includes an integrated footer or base operationally associated with each pole of the primary fence section; and
wherein a plurality of said primary fence sections and secondary fence sections are coupled together at variable angles using a connecting means resulting in a fence line of variable length and shape.

10. A portable electric fence kit for the erection of a re-usable, temporary electric fence comprising:
a primary fence section which is portable and non-electrified having two or more poles, the primary fence section has an inner side and an outer side, a top and a bottom;
a secondary fence section having two or more insulated poles secured to the poles of the primary fence section and having the ability to be electrified using a plurality of wires comprising insulated and non-insulated live wires which are secured to and span the distance between the insulated poles, the secondary fence section has an inner side and an outer side, a top and a bottom;
wherein the plurality of wires is secured to each of the insulated poles and spans the distance horizontally between the insulated poles in a pattern alternating between uninsulated wires and grounded wires with one or more insulated live wires at each end of the spanned distance;
wherein the secondary fence section is laterally secured to the primary fence section and the inner side of the primary fence section faces the outer side of the secondary fence section;
wherein the bottom of the primary fence and the bottom of the secondary fence are positioned at or near a same height as each other; and
wherein the top of the secondary fence is positioned at a height at or above the top of the primary fence;
system controls operationally associated with the plurality of wires of said secondary fence sections, said system controls having the ability to control the electrification of said secondary fence section;
a power source operationally associated with said fence sections and said system controls, said power source providing electricity to said secondary fence section;
a coupling means which allows for the plurality of wires associated with one secondary fence section of the fence kit to be coupled to the plurality of wires associated with another secondary fence section of the fence kit;
a monitoring module which allows for said electric fence to be monitored both on-site and/or remotely; and
an integrated footer or base operationally associated with each pole of the primary fence section;
wherein a plurality of said primary fence sections and secondary fence sections are coupled together at variable angles using a connecting means resulting in a fence line of variable length and shape.

11. The electronic fence kit of claim 10 wherein the plurality of wires are configured in a serpentine pattern.

12. The electric fence kit of claim 10 wherein the insulated poles of the secondary fence section span the same horizontal distance and vertical distance as the poles of the primary fence section.

13. The electronic fence kit of claim 10 wherein the insulated and non-insulated live wires are operationally associated with and originate at the system controls.

14. The electronic fence kit of claim 10 wherein the system controls include an electric fence energizer, a monitoring module, a control panel and a wireless communicator.

15. The electronic fence kit of claim 10 wherein the system controls are portable.

16. The electronic fence kit of claim 10 wherein the power source is selected from the group including, but not limited to, battery power, grid power, solar power, wind power, or a combination thereof.

* * * * *